United States Patent [19]

Pike

[11] 3,902,130
[45] Aug. 26, 1975

[54] IMPROVED APPARATUS FOR LENGTHENING LASER OUTPUT PULSE DURATION

[75] Inventor: Charles T. Pike, Lexington, Mass.

[73] Assignee: Jersey Nuclear-Avco Isotopes, Inc., Bellevue, Wash.

[22] Filed: May 14, 1973

[21] Appl. No.: 360,176

[52] U.S. Cl. ............. 330/4.3; 332/7.51; 331/94.5; 350/150
[51] Int. Cl. ............................................. H01s 3/10
[58] Field of Search .................. 330/4.3; 332/7.51; 331/94.5 C, 94.5 S; 350/150

[56] References Cited
UNITED STATES PATENTS

| | | | |
|---|---|---|---|
| 3,597,695 | 8/1971 | Swain et al. | 330/4.3 |
| 3,646,469 | 2/1972 | Buczak et al. | 331/94.5 C |
| 3,668,536 | 6/1972 | Michon | 330/4.3 |

OTHER PUBLICATIONS

Flament et al., "Absolute Gain measurements in a Multistage Dye Amplifier," 12/1/71, pp. 491–493, A.P.L., Vol. 19, No. 11.

Saskin et al., "Dispersive Resonators for Laser Frequency Tuning," 7/68, Ukranian Physics Journal, pp. 17–23, Vol. 13, No. 1.

Primary Examiner—Maynard R. Wilbur
Assistant Examiner—N. Moskowitz
Attorney, Agent, or Firm—Weingarten, Maxham & Schurgin

[57] ABSTRACT

A system for lengthening the pulse output of a relatively short duration of laser radiation from a pulse laser oscillator of high spectral purity without loss of the spectral purity. The laser system employs a regenerative laser amplifier and a pulse output configuration which provides isolation from the pulse input. The configuration of the laser amplifier permits multiple traversals of the laser amplifier to provide more efficient amplification for each oscillator pulse.

21 Claims, 2 Drawing Figures

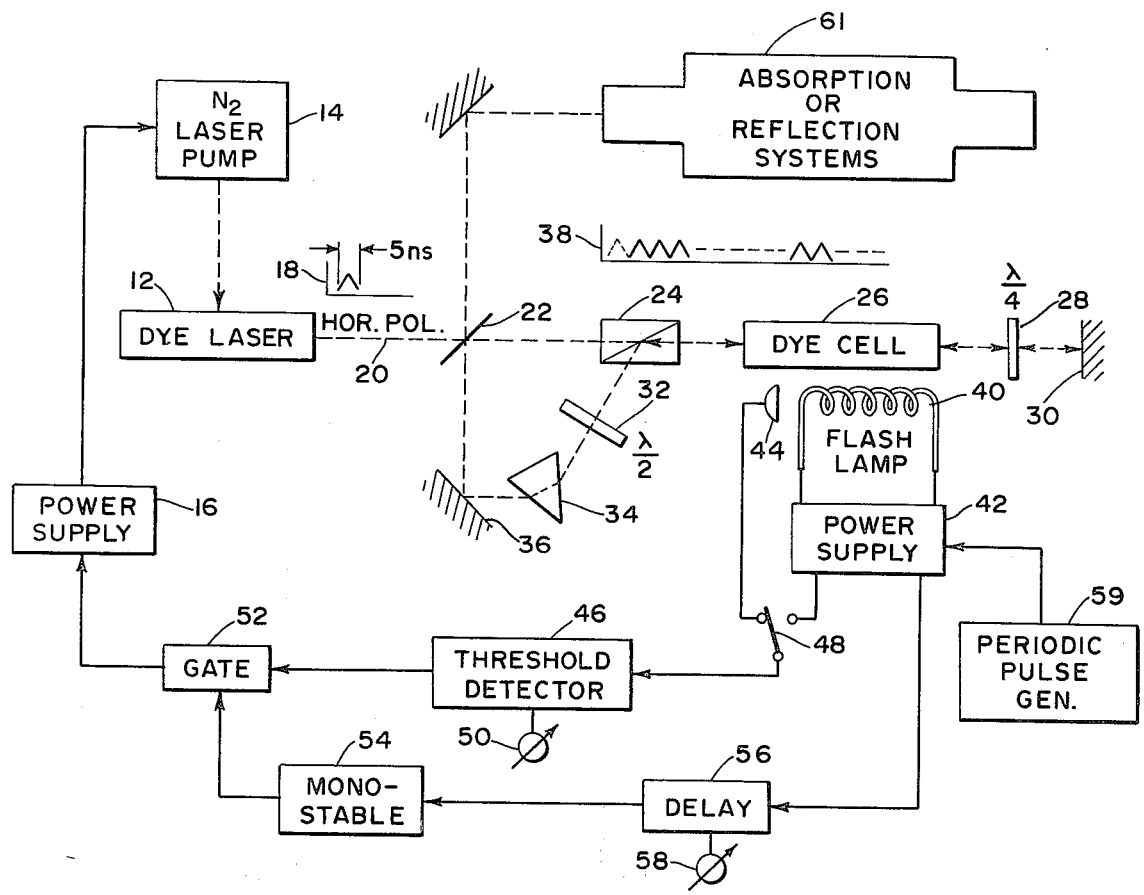
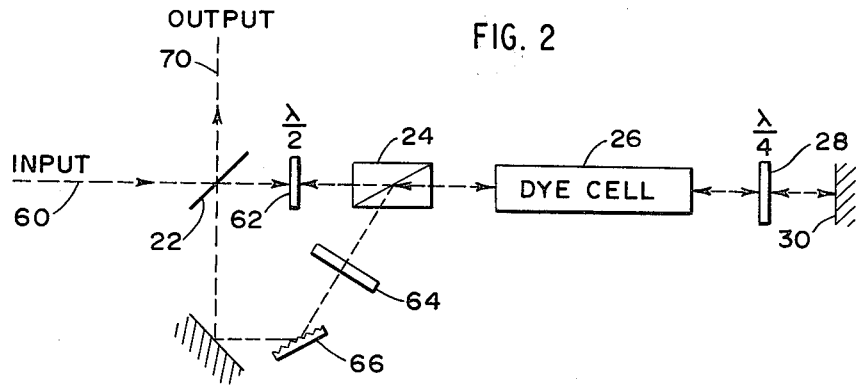

IMPROVED APPARATUS FOR LENGTHENING LASER OUTPUT PULSE DURATION

FIELD OF THE INVENTION

This invention relates to laser amplification and in particular to laser amplification which provides pulse elongation without loss of spectral purity.

BACKGROUND OF THE INVENTION

The recently developed tunable dye laser permits the generation of spectrally pure laser radiation at very nearly any selected frequency of over a range of frequencies associated with the particular dye, rather than being limited in frequency output to only a few widely separated discrete wavelengths. While such a dye laser may typically have an output pulse duration of only a few nanoseconds, in some applications for a dye laser it may be desirable to have a longer pulse duration. For example, where laser radiation is used to produce atomic or molecular resonant reflections, single frequency of a specific wavelength radiation is typically employed to produce appropriate resonant response. Where a dye laser is employed for this purpose it is advantageous to increase the pulse duration in order to make more energy available in the reflected pulse. Additionally, where the laser radiation is tuned to distinguish specific isotope absorption line for spectrographic or separation purposes, it is generally advantageous for the laser radiation employed to have a duration longer than the few nanoseconds that are typically associated with the output radiation pulse of the tunable dye laser. It will of course be clear to those skilled in the art that many other applications exist where it would be beneficial to be able to elongate the pulse duration of a laser such as a tunable dye laser, particularly of high spectral purity.

BRIEF SUMMARY OF THE INVENTION

In accordance with the present invention, a laser system is shown which provides pulse elongation as well as pulse amplification of a narrow bandwidth, short duration radiation pulse without spectral broadening; the resulting pulse output being suited for applications such as selective isotope absorption or reflection.

More particularly, the short duration and spectrally pure laser pulse is applied to a regenerative laser amplifier in a configuration which provides multiple traversals of each pulse through the laser amplifier, provides output pulse extraction in isolation from the input pulse, and further provides reapplication of a portion of each output pulse to the laser amplifier for generating a sequence of pulses thereby to lengthen the duration of the laser output.

In implementing the invention, the output of a tunable dye laser having a narrow bandwidth to provide special purity is applied through a beam splitter in one polarization to the tuned cavity of a laser amplifier. The applied laser pulse is typically of short duration, 5 nanoseconds being representative. After two traversals of the laser amplifier, the amplified pulse is emitted from the cavity at an orthogonal polarization and reflected through a frequency selective prism back to the beam splitter after repolarization to the original orientation. The beam splitter transmits a portion of the pulse to provide an output beam and reflects a portion of the pulse back to the amplifier in timed relation to directly follow the trailing edge of the preceding pulse into the amplifier. Pulses will be continually regenerated and amplified as long as the laser amplifier remains in an excited condition.

In order to time the generation of the initial pulse from the tunable dye laser to the moment when the laser amplifier has been excited to an amplifying condition but before self-oscillation and thus spectral broadening is possible, a control circuit is provided to monitor the build-up of laser amplifier excitation and, at a predetermined point, to trigger the initial pulse from the dye laser and commence the regenerative cycle that produces the sequence of output pulses.

BRIEF DESCRIPTION OF THE DRAWINGS

These and other features of the present invention are more fully described below in a detailed description of the preferred embodiment, presented for purposes of illustration and not by way of limitation, and in the accompanying drawings of which:

FIG. 1 is a system diagram of a laser pulse duration lengthening system according to the invention; and FIG. 2 is an illustration of a modification of the FIG. 1 apparatus.

DETAILED DESCRIPTION OF THE PREFERRED EMBODIMENT

A system which provides substantial elongation of the short duration, high spectral purity output pulse of a tunable dye laser without substantial spectral broadening is shown in FIG. 1. The laser system also provides efficient amplification of the laser pulse in multiple traversals through a single laser amplifier and provides a system output beam which is isolated from the input.

In particular, in FIG. 1, a dye laser 12 is typically excited by a nitrogen or other laser pump 14 which is in turn activated by a power supply 16. The laser output pulse, shown representatively in graph 18 as a short duration, five nanosecond pulse, preferably has a narrow spectral range.

The master oscillator laser which produces the output pulse of graph 18 may typically be a Dial-A-Line laser of the Avco Everett Research Laboratory, Everett, Massachusetts. Where additional spectral purity is desired a standard etalon filter may be used to achieve a further limitation in bandwidth.

The dye laser 12 will have an output beam 20 which by suitable orientation of the laser 12 is horizontally polarized and applied to a beam splitter 22. The majority of the radiation in beam 20 passes through the beam splitter to a Glan-Thompson polarizing crystal 24 which is oriented to pass the radiation in beam 20 to a dye cell 26. The cell 26 provides the laser amplification. The beam 20 after passing through the dye cell 26 is applied through a quarter wavelength retardation plate 28 which typically converts the horizontal polarization to circular. The beam is subsequently reflected by a 100% reflecting mirror 30 and returned through the quarter wavelength retardation plate 28 to the dye cell 26 for a second amplification. At this point, the radiation will have been shifted in polarization by 90° and upon leaving the dye cell 26 after the second amplification will be reflected by the Glan-Thompson polarizing crystal 24. This reflected wave is applied to a half wavelength retardation plate 32 to restore the horizontal polarization. The horizontally polarized beam may then be applied to a Brewster angle prism 34 to provide additional frequency selectivity. The beam leaving the prism 34 is applied to a 100% reflecting mirror 36 which directs it back toward the beam splitter 22. The beam splitter 22 is typically chosen to have a reflectivity for the radiation from mirror 36 so as to return a predetermined portion of that radiation to the dye cell 26 through the crystal 24 in a regenerative loop. The predetermined portion is preferably chosen to be equal to the reciprocal of the amplification of the beam in its multiple passes through the dye cell 26. Additionally, the optical path for the beam 20 in making the round trip from the beam splitter 22 through the dye cell 26 back to the beam splitter 22 from the mirror 36 is preferably selected to be at least equal to the width of the pulse such that the predetermined portion reflected by the mirror 22 is reapplied to the dye cell 26 directly after the previous pulse to produce a continuous sequence of equal amplitude pulses as shown in graph 38. The configuration shown permits extraction of the amplified pulses from the laser amplifier in isolation from the input radiation such that no output radiation is reapplied to the laser 12 to disturb its operation. The duration of the sequence of pulses will be determined by the period during which the dye cell 26 is maintained in a lasing condition.

For this purpose, the dye cell 26 is excited to a lasing condition by creating a population inversion in the dye molecules through the application of excitation energy from a flashlamp 40. The flashlamp 40 is activated by a power supply 42. To provide proper synchronization between the activation of the power supply 42 and resulting excitation radiation from flashlamp 40 and the triggering of the dye cell 12 through the pump laser 14 and power supply 16, a photo detector 44 is provided to detect excitation illumination from the flashlamp 40 and apply it to a threshold detector 46. Optionally, a signal representing the current applied to the flashlamp 40 may be selected by a switch 48 for application to the threshold detector 46 instead of the signal from the photo detector 44. The threshold detector 46 is adjustable by a control 50 to provide an output signal through a gate 52 at a predetermined amplitude in the sensed photo detector signal or flashlamp current. The gate 52 is, in the preferred embodiment of the invention, opened to conduct the signal from the threshold detector 46 to activate the power supply 16, only for a short interval defined by a monostable circuit 54. The monostable circuit 54 is triggered by a delay circuit 56 whose delay is varied by a control 58. The delay circuit 56 responds to a flashlamp activation signal from the supply power 42, and accordingly the gate 52 is opened only for a short period directly subsequent to the energizing of the flashlamp 40. A pulse generator 59 may be used to provide periodic repeated activation of power supply 42 to repeatedly generate the sequence of pulses at a predetermined repetition rate for the particular application as in an absorption or reflection system 61.

The adjustment of the threshold detector 46 is preferably such that the pulse of radiation in the beam 20 is applied to the dye cell 26 at a point when sufficient energy has been applied to the dye cell to provide laser amplification but before a self-oscillating condition for the dye cell 26 has been created. This maintains the spectral purity for the exemplary applications of selective isotope absorption or reflection. Additional tuning elements may be inserted in the laser beam path as found desirable.

The FIG. 1 implementation can also be operated with the input and output reversed so long as the polarization (electric vector) of the input radiation is kept in the plane of the drawing.

In FIG. 2, a modification of the system of FIG. 1 is presented which indicates structure for use with vertically polarized input and output beams. In this case, an input beam 60 is applied to the beam splitter 22 with vertical polarization (orthogonal to the plane of the page). The beam is substantially transmitted through the beam splitter 22 and rotated by a half wavelength retardation plate 62 for application through the Glan-Thompson polarizer 24 to the dye cell 26, quarter wave retardation plate 28 and mirror 30. Quarter wavelength retardation by plate 28 results in circular polarization which is converted to vertical after reflection by mirror 30 and reverse passage through plate 28. The returning, vertically polarized radiation is again amplified in dye cell 26 but is reflected by crystal 24 to an optional filter 64, grating 66 and mirror 68 which directs the vertically polarized beam to beam splitter 22 to divide the radiation between an output beam 70 and the portion reapplied to the dye cell 26. Filter 64 provides optional frequency selectivity as does grating 66. The grating 66 will have the grating lines parallel or orthogonal to the laser polarization. Other considerations of timing and cavity length discussed with regard to FIG. 1 apply here as well.

In accordance with the above preferred embodiment, a laser pulse stretcher is shown, which provides a substantial increase in the number of available photons with high spectral purity for use in the applications mentioned above. It will occur to those skilled in the art that modifications and alterations to the disclosed system may be achieved without departing from the spirit of the invention. Accordingly, it is intended to limit the scope of the invention only as indicated in the following claims.

What is claimed is:
1. A system for lengthening the output pulse of a laser radiation source comprising:
   means for providing a laser radiation pulse;
   means for amplifying the laser radiation pulse and including means for energizing the laser amplifying means to an amplifying condition;
   means for applying the laser radiation pulse from said pulse providing means to said amplifying means and producing a plurality of passes for radiation from said pulse providing means through said amplifying means to provide an amplified pulse of laser radiation;
   means for extracting the amplified pulse from said laser amplifying means in isolation from the laser radiation pulse applied to said laser amplifying means; and
   means for reapplying a portion of the amplified pulse to said laser amplifying means thereby to generate a sequence of amplified pulses.
2. The system of claim 1 wherein:
   means are provided to produce said amplified pulse along a path separate from said laser radiation pulse; and
   said means for reapplying a portion of the amplified pulse from said amplifying means includes means for laser pulse splitting positioned to receive said laser radiation pulse from said pulse providing means and the amplified pulse from said amplifying means along the separate paths to pass said laser radiation pulse to said amplifying means and reflect said portion of said amplified pulse to said amplifying means.

3. The system of claim 1 wherein said means for extracting the amplified pulse includes means for separating the laser radiation pulse and amplified pulse onto different optical paths.

4. The system of claim 3 wherein:
said means for providing said laser radiation pulse includes means for providing a preselected polarization in said laser radiation pulse; and
said means for separating includes:
  means for shifting the polarization of the amplified pulse with respect to the laser radiation pulse; and
  means responsive to pulse polarization for deflecting one of said laser radiation pulse or said amplified pulse to provide said separate paths therefor.

5. The system of claim 4 wherein said deflecting means includes a Glan-Thompson crystal.

6. The system of claim 4 wherein said shifting means includes a retardation plate.

7. The system of claim 3 further including frequency selective means in at least one of the separate paths.

8. The system of claim 7 wherein said frequency selective means includes means responsive to radiation in the at least one path to pass that radiation at an angle which depends upon the frequency of the radiation.

9. The system of claim 1 wherein:
said laser radiation pulse applied to said amplifying means is polarized in a first direction;
means are provided for reflecting radiation of one polarization;
means are provided for changing the polarization of radiation passing through said amplifying means whereby the amplified pulse is polarized differently from the laser radiation pulse.

10. The system of claim 1 further including means for maintaining a generally constant pulse amplitude in said sequence of amplified pulses.

11. The system of claim 1 further comprising means responsive to said means for energizing said amplifying means for activating said laser radiation pulse providing means at a predetermined point with respect to the energization of said laser amplifying means whereby the output pulse of said laser radiation pulse providing means is applied to said laser amplifier at a sufficiently early time to reduce spectral broadening.

12. The system of claim 11 further including means for enabling activation of said pulse producing means during a predetermined interval after energizing of said laser amplifying means.

13. The system of claim 11 wherein:
said energizing means includes a source of radiation;
said activating means includes means for sensing the radiation from said energizing means and means for sensing a predetermined amplitude in the excitation radiation for said laser amplifying means.

14. The system of claim 1 wherein said laser radiation pulse is isotopically selective in bandwidth.

15. A system for lengthening the duration of high spectral purity laser radiation comprising:
a source of laser pulse radiation activatable in response to a control;
said source having a predetermined polarization in its laser pulse radiation;
means for amplifying said laser pulse to provide an amplified laser pulse;
means associated with said amplifying means for providing a polarization shift in said amplified laser pulse with respect to the laser pulse before amplification;
said laser pulse and said amplified laser pulse have a coincident optical path over at least a region;
means sensitive to radiation polarization for deflecting one of said laser pulse and amplified pulse from the coincident optical path to provide separated optical paths;
means for converging the separated paths at a substantial angle; and
means responsive to radiation on the converged optical paths for reapplying a portion of the amplified laser pulse to said amplifying means to provide regeneration of said amplified laser pulse so as to produce a sequence of amplified laser pulses of duration substantially longer than said laser pulse.

16. A method for lengthening the output pulse of a high spectral purity laser radiation source comprising the steps of:
generating a pulse of laser radiation;
amplifying the laser radiation pulse in a plurality of traversals of said laser radiation pulse through laser amplifying means to provide an amplified pulse of laser radiation;
extracting the amplified pulse in isolation from said laser radiation pulse; and
reapplying a portion of the amplified pulse to said laser amplifying means after a predetermined interval to produce a sequence of pulses defining the lengthened output pulse.

17. The method of claim 16 wherein said laser radiation pulse is polarized and said extracting step includes the steps of:
shifting the polarization of said pulse; and
diverting the differently polarized pulses to different optical paths.

18. The method of claim 17 further including the step of:
converging the divergent optical paths at a substantial angle;
said reapplying step including the step of reflecting the amplified pulse in converging paths toward said laser amplifying means.

19. The method of claim 16 further including the step of providing an isotopically selective bandwidth in said laser radiation pulse.

20. A method for lengthening the output pulse of a high spectral purity laser radiation source comprising the steps of:
generating a pulse of laser radiation;
amplifying the laser radiation pulse in a plurality of traversals of said laser radiation pulse through laser amplifying means to provide an amplified pulse of laser radiation;
frequency filtering the amplified pulse;
extracting the amplified pulse in isolation from said laser radiation pulse; and
reapplying a portion of the amplified pulse to said laser amplifying means.

21. The method of claim 16 further including the step of providing the generation of said laser radiation pulse and the excitation of said laser amplifier means to an amplifying condition in timed relation to provide amplification of said laser radiation pulse without substantial spectral broadening.

* * * * *